(12) United States Patent
Hyde et al.

(10) Patent No.: US 8,893,053 B1
(45) Date of Patent: Nov. 18, 2014

(54) METHOD AND APPARATUS FOR ALTERING MOBILE DEVICE FUNCTIONALITY

(75) Inventors: Caleb S. Hyde, Kansas City, MO (US); Clark D. Halferty, Lees Summit, MO (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 432 days.

(21) Appl. No.: 12/761,103

(22) Filed: Apr. 15, 2010

(51) Int. Cl.
*G06F 3/00* (2006.01)

(52) U.S. Cl.
USPC .......................................................... 715/863

(58) Field of Classification Search
CPC ............... H04Q 7/20; G06F 3/00; G06F 7/04; H04L 9/32
USPC .......................... 345/173–179; 455/441, 456.1
See application file for complete search history.

(56) References Cited

U.S. PATENT DOCUMENTS

| | | | |
|---|---|---|---|
| 5,148,153 A | 9/1992 | Haymond | |
| 5,559,961 A | 9/1996 | Blonder | |
| 6,225,890 B1 * | 5/2001 | Murphy | 340/426.19 |
| 6,256,558 B1 | 7/2001 | Sugiura et al. | |
| 6,353,778 B1 | 3/2002 | Brown | |
| 6,430,488 B1 * | 8/2002 | Goldman et al. | 701/36 |
| 6,690,940 B1 | 2/2004 | Brown et al. | |
| 7,174,462 B2 | 2/2007 | Pering et al. | |
| 7,181,229 B2 | 2/2007 | Singh et al. | |
| 7,188,314 B2 * | 3/2007 | Mizrah | 715/741 |
| 7,292,230 B2 | 11/2007 | Tokkonen | |
| 7,479,949 B2 * | 1/2009 | Jobs et al. | 345/173 |
| 2002/0138271 A1 | 9/2002 | Shaw | |
| 2003/0109246 A1 | 6/2003 | Shimizu et al. | |
| 2004/0085351 A1 | 5/2004 | Tokkonen | |
| 2004/0230843 A1 | 11/2004 | Jansen | |
| 2005/0010785 A1 | 1/2005 | Abe et al. | |
| 2005/0255874 A1 | 11/2005 | Stewart-Baxter et al. | |
| 2005/0283726 A1 | 12/2005 | Lunati | |
| 2006/0058036 A1 | 3/2006 | Watanabe et al. | |
| 2006/0099940 A1 | 5/2006 | Pfleging et al. | |

(Continued)

FOREIGN PATENT DOCUMENTS

| | | |
|---|---|---|
| EP | 1 589 727 | 10/2005 |
| GB | 2 420 059 | 5/2006 |
| WO | WO 99/49681 | 9/1999 |

OTHER PUBLICATIONS

U.S. Appl. No. 12/263,964, filed Nov. 30, 2008.

(Continued)

*Primary Examiner* — Tony N Ngo (57) ABSTRACT

A method to help restrict operation of a mobile device in a situation where a user of the device may be distracted, such as when the user is driving a motor vehicle. The device presents the user with a test and reveals the solution to the test, and the user must then enter into the device the revealed solution within a predefined period of time. If the user enters the revealed solution within the predefined period of time, then a fair assumption is that the user is not distracted. On the other hand, if the user does not enter the revealed solution within the predefined period of time, then a fair assumption is that the user is distracted (e.g., is driving), in which case the device will responsively change an operational characteristic of the device so as to restrict the user's interaction with and operation of the device.

21 Claims, 7 Drawing Sheets

1(a)  1(b)

(56) References Cited

U.S. PATENT DOCUMENTS

| | | | |
|---|---|---|---|
| 2006/0174339 A1* | 8/2006 | Tao | 726/18 |
| 2007/0032225 A1 | 2/2007 | Konicek et al. | |
| 2007/0072616 A1* | 3/2007 | Irani | 455/441 |
| 2007/0150842 A1* | 6/2007 | Chaudhri et al. | 715/863 |
| 2008/0133230 A1 | 6/2008 | Herforth | |
| 2009/0098855 A1 | 4/2009 | Fernandez et al. | |
| 2009/0111422 A1 | 4/2009 | Bremer et al. | |
| 2009/0284482 A1* | 11/2009 | Chin | 345/173 |
| 2011/0047368 A1* | 2/2011 | Sundaramurthy et al. | 713/100 |
| 2011/0154444 A1* | 6/2011 | Sriraghavan et al. | 726/4 |

OTHER PUBLICATIONS

International Search Report and Written Opinion of the International Search Authority from International Application No. PCT/US09/63119, dated Feb. 12, 2010.

EPO Published Abstract of Japanese Publication No. 2003 316252, published Nov. 7, 2003.

Halfbakery, "Cell Phone Use Control," http://www.halfbakery.com/idea/Cell_20Phone_20Use_20Control, printed from the World Wide Web on Nov. 9, 2007.

Halfbakery, "Cell Phone Block While Driving," printed from the World Wide Web on Apr. 8, 2010.

AppScout: More Mobile Software, "Textecution Saves Lives by killing Texting," http://www.appscout.com/mobile_software/more, php?p=1, printed from the World Wide Web on Jan. 16, 2009.

T Mobile, "GI User Guide," Document Rev 08—Sep. 12, 2008.

"GridLock Manual, GridLock V1.32," 2001-2004 PDAbusiness.com, http://www.pdabusiness.conn/gridlock/manual/manual.html, printed from the World Wide Web, Jun. 24, 2004.

CastleCops, "Authora Inc Announces Zendit v2.5 Release," http://computercops.biz/article2451.html, May 19, 2003.

Office Action from U.S. Appl. No. 10/925,381, dated May 11, 2007.

Jennifer Johnson, "TXTBlocker Lets Users Disable Texting & Other Features While Driving," HotHardWare, Oct. 3, 2009.

ZoomSafer, Your personal safe driving assistant- . . . , printed from the World Wide Web, http://www.zoomsafer.com/personal.aspx, Jan. 4, 2010.

* cited by examiner

METHOD AND APPARATUS FOR ALTERING MOBILE DEVICE FUNCTIONALITY

BACKGROUND

In recent years, the popularity of mobile devices has grown substantially. It is now commonplace for people to carry and use mobile devices, such as cell phones, personal digital assistants, navigation units, tablet computers, notebook computers, media players, and gaming devices, at virtually any location. Some of these devices provide communication service, such voice calling, text messaging, and online browsing and gaming functionality for instance, while other devices may only provide more solitary functions, such as local game play, media playout, or contact list management for instance. Generally, mobile devices may range in size and configuration and may have single-component or multi-component configurations. Further, some mobile devices may be linked with other entities. For instance, mobile phones, navigation units, computers, or media players may be integrated or otherwise coupled with motor vehicles such as a cars, trucks, boats, and airplanes, to allow use of the device functions in connection with those vehicles.

Most of today's mobile devices include advanced display screens, such as liquid crystal display (LCD) screens or organic light emitting diode (OLED) display screens for instance, that allow robust user interaction. A display screen will typically work to present various graphical objects, such as text and images, under processor control. Further, the display screen may employ touch-sensitive screen technology, such as resistive, capacitive, or surface acoustic wave technology for instance, to allow a user to provide input to the mobile device by touching the screen. Alternatively or additionally, a mobile device may include a keypad (e.g., numeric keypad, keyboard, etc.), or other non-screen-based user-input mechanism.

Overview

Disclosed herein is a method to help restrict the operation of a mobile device in a situation where a user of the device may be distracted, such as when the user is driving a motor vehicle for instance.

According to the method, the mobile device will present the user with a test and will reveal the solution to the test, and the user then will be required to enter into the device the revealed solution within a predefined period of time. If the user enters the revealed solution within the predefined period of time, then a fair assumption is that the user is not distracted, and so the mobile device will allow the user to operate the mobile device with little or no restriction. On the other hand, if the user does not enter the revealed solution within the predefined period of time, then a fair assumption is that the user is distracted (e.g., is driving), in which case the mobile device will responsively change an operational characteristic (e.g., one or more functions) of the mobile device so as to restrict the user's interaction with and operation of the device.

The change in operational characteristic of the mobile device may restrict user interaction with the device in a manner that allows the user to more readily focus on one or more other activities, such as driving for instance. By way of example, the change in operational characteristic of a cell phone or other device that supports text-messaging functionality may be disabling of text messaging functionality, or disabling of display screen output so as to prevent the user from reading the display or from manually entering text with display feedback. As another example, the change in operational characteristic of the device may be disabling of one or more non-hands-free functions such as keypad or touch-screen based text entry for instance, while allowing hands-free functions such as voice command and audible feedback. Other examples are possible as well. Further the change in operational characteristic can be temporary, with the device being set to automatically undo the change after a set period of time or to undo the change for another reason. Although the change will preferably be in effect long enough to render the restriction meaningful.

Optimally, the test that the device presents to the user will be a test to see how well the user can tactilely (physically) manipulate the device, under the theory that poor tactile interaction by the user may mean that the user is distracted by some other activity (such as driving for instance). The test of the user's ability to tactilely interact with the mobile device can take various forms.

By way of example, the test may involve the device presenting on its display screen a graphical display that comprises multiple objects having a sequential order that is revealed by the graphical display. If the mobile device has a touch-screen, the test may then require the user to touch the presented objects in their revealed sequential order within the predefined period of time or, if the objects are positioned out of order, to drag the objects into their revealed sequential order within the predefined period of time. Alternatively, if the objects are characters or other indicia that can be entered with a keypad of the device, the test may require the user to enter the presented objects in their revealed sequential order using the device keypad within the predefined period of time.

By having the graphical display reveal the sequential order of the presented objects, the present method advantageously enables a user to manipulate the device in accordance with the presented sequence and thus operates to test the user's ability to engage in such manipulative tactile interaction without a need for the user to have pre-existing knowledge of the sequence. Indeed, in a robust implementation of the method, the device may randomly generate and/or randomly position the objects of the graphical display so that the presentation differs each time, again as long as the graphical display reveals the sequential order of the objects, such as by visibly numbering or lettering the objects or aligning the objects in a manner that denotes their sequence, for instance.

Optimally, the method may be carried out in a situation where it would be advantageous to test the ability of the user to engage in tactile interaction with the device. Various trigger conditions could be defined for this purpose, and the device may be programmed to detect such a trigger condition (by itself and/or through information provided by the user or some other entity) and to responsively execute the test.

By way of example, the trigger condition may comprise the user driving a motor vehicle. For instance, when the user tries to use the mobile device, the device may apply an analysis to determine whether the user is driving a motor vehicle. If a mechanism exists to determine with fair certainty that the user is driving a motor vehicle (such as the user entering into the device a specification that the user is driving a motor vehicle), the device may apply that method. In practice, however, the device may not be able to determine with certainty if the user is actually driving a motor vehicle, so the device may instead evaluate one or more circumstantial factors that suggest the user may be driving. Such factors may include the device itself being in a moving vehicle (e.g., detected through communication with an in-vehicle system), the device being positioned in the driver's area of a moving vehicle (e.g., detected through communication with an in-vehicle system), the device moving at typical vehicular speed (e.g., detected through communication with an in-vehicle system or by location or speed tracking technology), the device moving along a known roadway (e.g., detected through communication with a local or network based navigation or mapping system). Further, supplemental factors may include the user being of at least driving age under applicable law or otherwise being legally permitted to drive a motor vehicle (e.g., detected by reference to a local or network user profile record or query of government driver license/permit database). Other examples are possible as well.

These as well as other aspects, advantages, and alternatives will become apparent to those of ordinary skill in the art by reading the following description, with reference where appropriate to the accompanying drawings. Further, it should be understood that the description provided by this document, including this overview section, is intended to explain the present method and apparatus by way of example only and that numerous variations are possible.

DETAILED DESCRIPTION

As noted above, FIG. 1 illustrates a mobile device presenting a graphical display to test a user's ability to engage in tactile interaction with the device, as a basis for the device to decide whether to change an operational characteristic so as to limit user interaction with the device. As indicated above, the mobile device may be programmed to execute such a test in response to detecting a trigger condition such as (but not limited to) one or more factors indicating that the user is driving while attempting to use the mobile device.

In accordance with the present method, the mobile device may respond to the trigger condition by presenting a graphical display comprising a plurality of objects, with the objects having a sequential order that is revealed by the graphical display. FIG. 1a depicts one of many possible examples of this process. In particular, FIG. 1a depicts the mobile device presenting a number of graphical buttons at randomly selected positions on its display screen, and labeling the buttons with numerals 1, 2, 3, 4, 5, and 6. The number of buttons displayed, and the shape, size, positioning, and other characteristics of the buttons, as well as the manner in which their sequence is specified, is of course a matter of design choice, but the number and positioning should be sufficient to adequately test the user's tactile interaction within a defined time period. Thus, merely one or two buttons may be insufficient in typical practice. Further, the presentation may span multiple displays, such as by presenting a first portion of the sequence at once, and then separately presenting a continuation of the sequence.

With the example shown, the sequential order of the displayed buttons is revealed by the graphical display, as the graphical display shows the numerical order of the buttons by labeling the buttons with numbers. Thus, the sequential order of the buttons in the figure would logically be 1, 2, 3, 4, 5, 6. As noted above, the fact that the graphical display reveals the sequential order allows the mobile device to test the user's ability to tactilely interact with the mobile device without requiring the user to have some sort of advanced secret knowledge of the sequential order. Indeed, in a preferred implementation, each time the mobile device executes the test, the mobile device would present the graphical objects at random locations on its screen, so that the user could not have such advanced knowledge.

In practice with this example, the mobile device may be arranged to test the user's tactile interaction by determining whether the user touches the displayed buttons or other objects in their revealed sequential order within a predefined period of time. Thus, as represented generally by FIG. 1b, the user would first need to touch button 1, then touch button 2, then touch button 3, then touch button 4, then touch button 5, and then touch button 6. The required touching could be accomplished by tapping the respective buttons. Alternatively, the required touching could be accomplished by sliding a finger from one button to the next, through the sequence. Further, the predefined period of time can be set to be a time period sufficient to test the user and may be dynamically varied based on the number, size, complexity, positioning, or other characteristics of the presented graphical objects.

If the mobile device determines that the user touches the buttons out of sequence, the mobile device may present the user with an indication that the user has not yet passed the test. For instance, the mobile device may flash a color in the background and/or present a graphical notice specifying that the user erred. Provided that the predefined time period has not yet expired, the mobile device may then allow the user to re-start touching the buttons in their revealed sequential order. Alternatively or additionally, the mobile device may responsively present a different graphical display with buttons or other objects presented at different locations or in a different order on the screen, but again with the sequential order of the objects revealed by the graphical display, giving the use the opportunity to try again. The mobile device may re-start the timer or may continue the timer. Further, if the mobile device determines that the user has failed a defined number of times in a row or in a given time period, the mobile device may prevent the user from trying again, perhaps for a period of time.

Ultimately, the mobile device will determine whether the user has touched the buttons in their revealed sequential order within the predefined period of time.

If the mobile device detects that the user has touched the buttons in their revealed sequential order before the predefined time period has expired, then the mobile device may proceed without changing an operational characteristic. More particularly, the mobile device may allow the user to interact with the mobile device with limited or no restrictions.

On the other hand, if the mobile device determines that the predefined time period has expired before the user has successfully touched the buttons in their revealed sequential order, then the mobile device may responsively change an operational characteristic of the mobile device, preferably limiting or disabling one or more functions of the mobile device so as to thereby limit user interaction with the mobile device.

As noted above, this change may be temporary. For instance, the device may programmatically undo the change (e.g., by removing the one or more limitations) after a period of time or in response to a determination that the trigger condition no longer exists (e.g., if the user stopped driving, such as if the vehicle comes to a stop). Optimally, however, the limitation would be in place long enough to affect the user's currently attempted use of the mobile device.

Further, the mobile device may check for the trigger condition regularly. For instance, if the mobile device detects that that trigger condition does not exist or determines that the user has passed the test, the mobile device may again check for the trigger condition after some defined period and may then execute the test if the trigger condition exists. In this way, the mobile device may help to avoid the scenario where the driver of a vehicle begins using the mobile device while the vehicle is stopped (or otherwise when the trigger condition does not exist) and then continues to use the mobile device in an unrestricted manner as the vehicle begins moving (or once the trigger condition exists). Further, by checking for the trigger condition periodically, the mobile device may help to ensure that that device functions are limited if the user subsequently becomes distracted.

Figure 1:
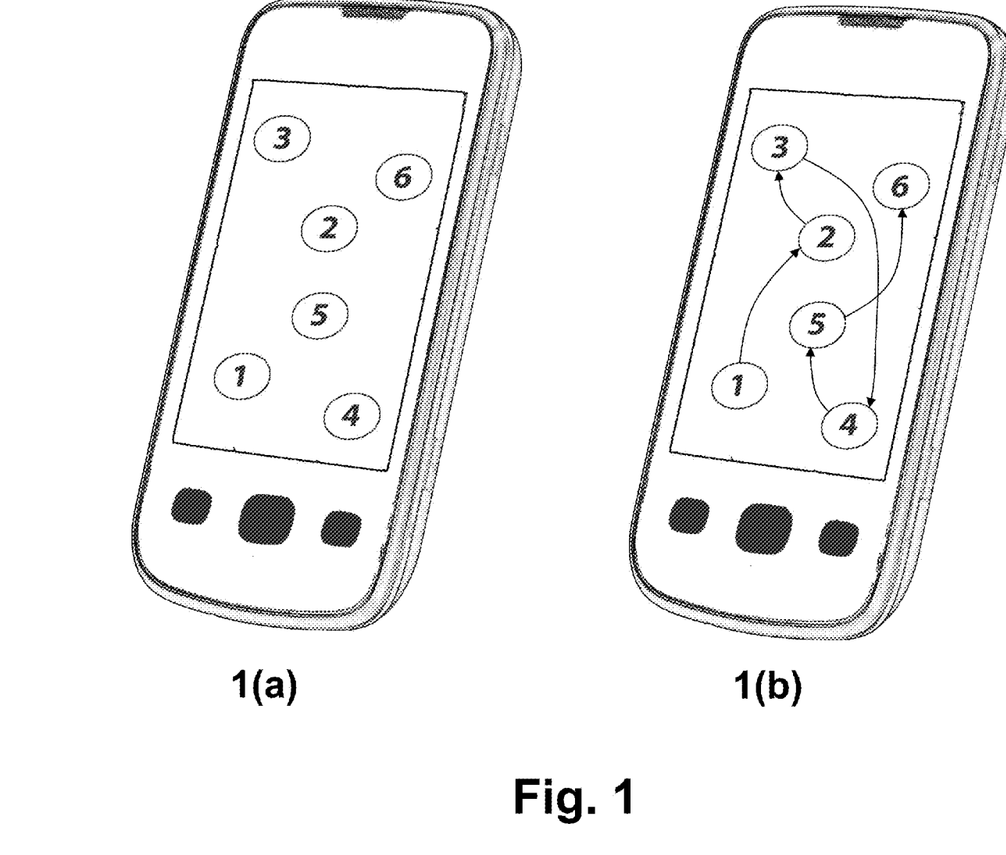
FIG. 1 is an illustration of a mobile device presenting a graphical display to test user tactile interaction with the device as a basis to decide whether to change an operational characteristic of the device.
Figure 2:
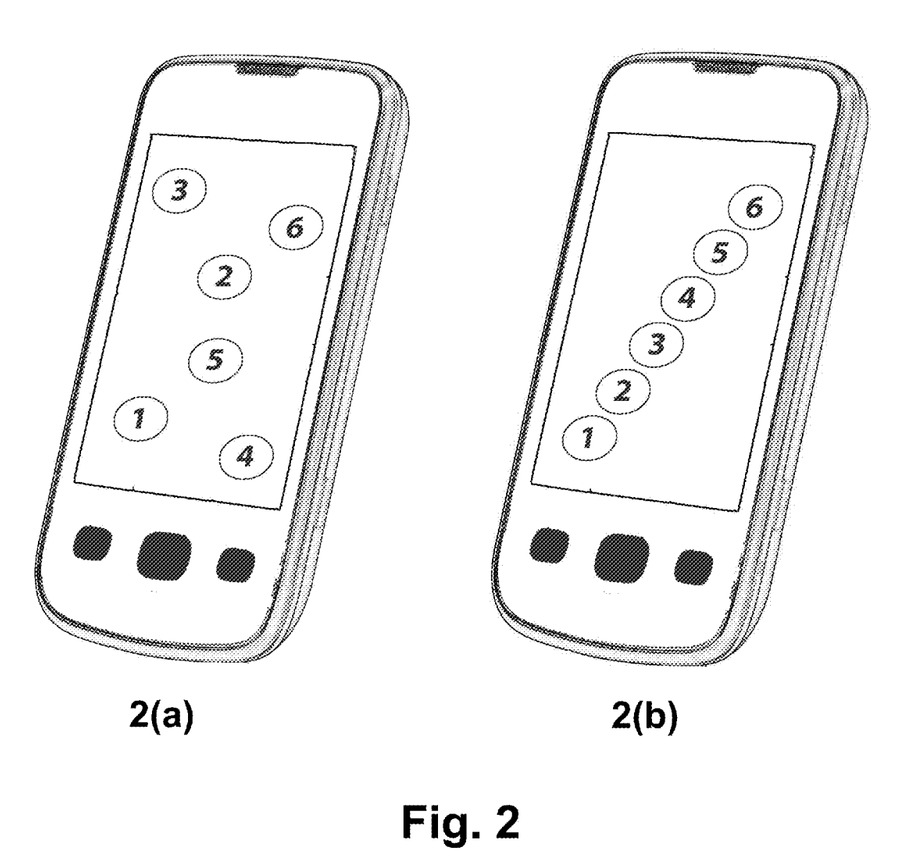
FIG. 2 is another illustration of a mobile device presenting a graphical display to test user tactile interaction with the device as a basis to decide whether to change an operational characteristic of the device.

FIG. 2 depicts another example of how the mobile device may test the user's ability to tactilely interact with the mobile device, as a basis to decide whether to change an operational characteristic of the mobile device. FIG. 2a begins in the same form as FIG. 1a. In this example test, however, the user may be required to drag the presented objects into their revealed sequential order, through touch-interaction with the display screen. Thus, for instance, the user may drag the presented buttons into a line (or approximate line) as shown in FIG. 2b. If the mobile device determines that the user has not moved the objects into their revealed sequential order within the predefined time period, then the mobile device may responsively change an operational characteristic of the mobile device so as to limit user interaction with the device.

Figure 3:
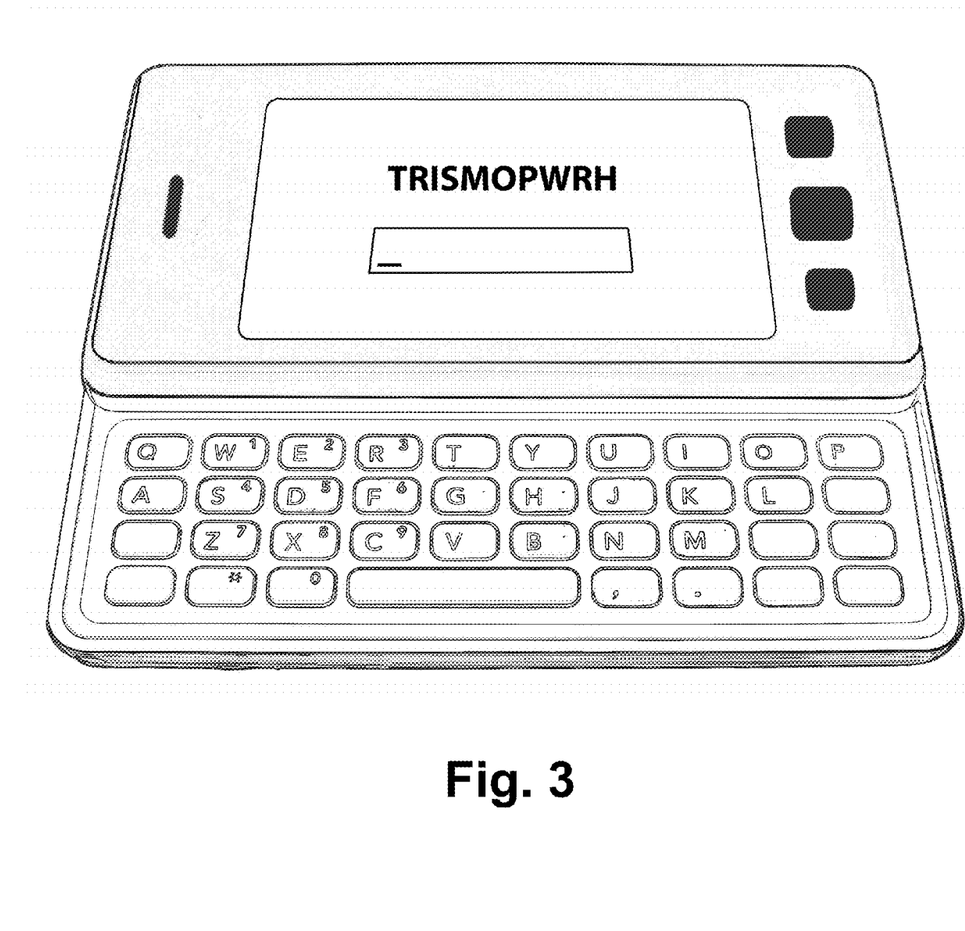
FIG. 3 is another illustration of a mobile device presenting a graphical display to test user tactile interaction with the device as a basis to decide whether to change an operational characteristic of the device.

FIG. 3 depicts yet another example of how a mobile device may test the user's ability to tactilely interact with the mobile device. In this example, the mobile device presents a number of graphical objects on its display screen and reveals the sequential order of the graphical objects by presenting the objects in order on the screen. In this example, the graphical objects are characters, such as number, letters, punctuation marks, or other indicia (e.g. shapes) that correspond with keys on a keypad of the mobile device. The mobile device in this figure is shown having a keypad through which the user can then enter the characters in the sequential order that they are displayed. Further, although the keypad is shown as a physical pull-out keypad, a touch-screen based keypad could be used instead.

The graphical display in this example reveals the sequence of the presented objects by presenting the objects in a physical orientation defining the sequence. In particular, the graphical display presents the displayed characters as a character string "TRISMOPWRH" such that the characters have a revealed order that is the order in which the characters appear in the presented string. Preferably, the mobile device will randomly generate such a character string so that the string will not be one that the user is accustomed to entering. Further, the mobile device may include characters other than alphabetical characters in the string, and the character string may comprise multiple sequentially presented strings. Still further, there may be other ways that the mobile device can present characters in a particular sequence on the display screen.

To test the user's ability to tactilely interact with the mobile device in this example, the mobile device may determine whether the user enters the character string into the device within a predefined period of time, using the keypad of the mobile device. For this purpose, as shown, the graphical display may present a text box or the like that echoes what the user types on the device keypad. Alternatively, the device may not provide visible feedback of what the user is typing on the keypad.

If the mobile device determine that the user enters the presented character string (i.e., enters the presented characters in their revealed sequence) within the predefined period of time, the mobile device may then proceed without changing an operational characteristic, thus allowing the user to interact with the mobile device with limited or no restrictions. On the other hand, if the mobile device determines that the predefined time period has expired before the user has successfully entered the presented character string, then the mobile device may responsively change an operational characteristic of the mobile device, preferably limiting or disabling one or more functions of the mobile device so as to thereby limit user interaction with the mobile device.

Figure 4:
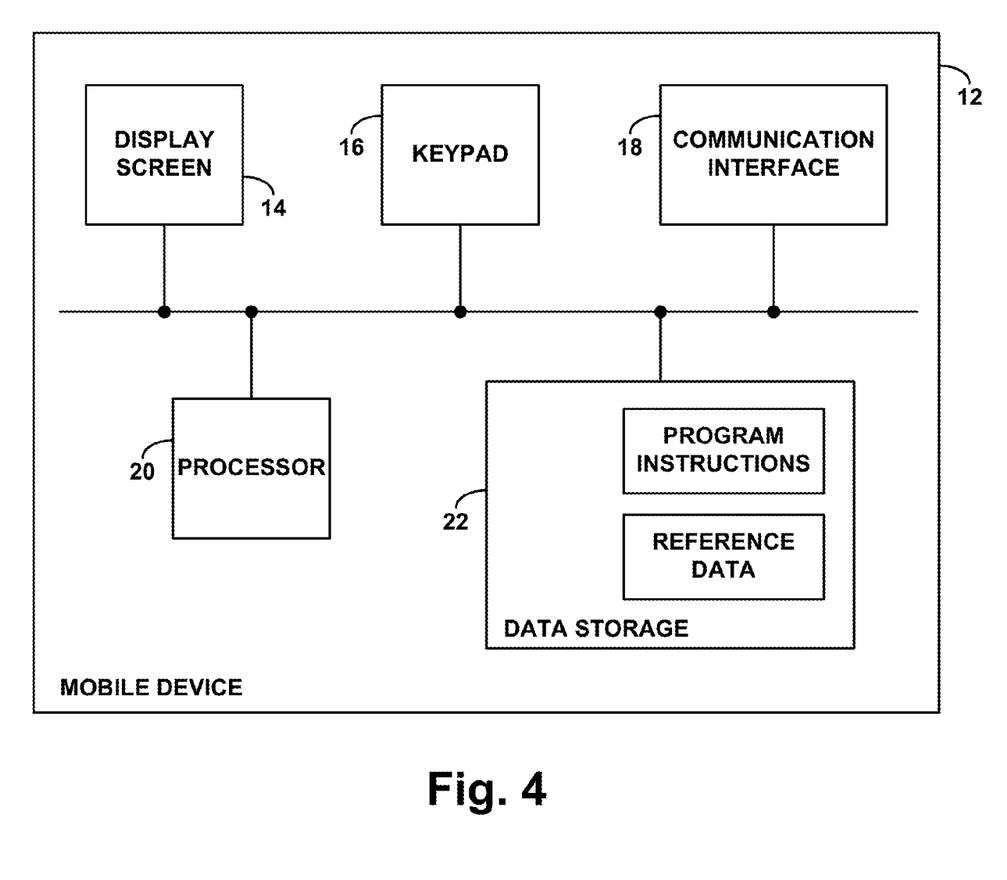
FIG. 4 is a simplified block diagram showing functional components of a mobile device arranged to implement the present method.

FIG. 4 is next a simplified block diagram depicting functional components of an example mobile device 12 arranged to implement the present method. Generally, the mobile device may take the form of any of the types of devices noted above or any other mobile device now known or later developed. Although FIGS. 1-3 depict mobile devices with "candybar" form factors and with or without an accessible physical keypad, the mobile device could thus take any of a variety of other forms. For instance, the mobile device may have a clamshell form factor or may comprise multiple interconnected components.

As shown, the mobile device includes a display screen 14, a keypad 16, a communication interface 18, a processor 20, and data storage 22, all of which may be integrated together in various ways or communicatively linked together by a system bus or other mechanism 24. Further, these components may be provided in a mobile device housing or may be provided separately and coupled together through wired or wireless links. Still further, the example mobile device can of course take other forms, including other components, excluding one or more components, distributing components in other ways, or modified in some other manner.

Display screen 14 may comprise any type of display screen that is capable of presenting a graphical display in accordance with the present method. Examples of such screens include LCD and OLED screens as noted above, among others now known or later developed. Further, the display screen may include touch-sensitive technology to allow a user to provide input to the mobile device by touching particular points or areas on the screen. Such technology may similarly take any of the forms noted above or any other form now known or later developed. Although not shown, the mobile device may also include a display driver such as a chipset optimized to control video output and, in the case of touch-sensitive screen, to control touch-screen input.

Keypad 16 may comprise an alphanumeric keypad, a QWERTY keyboard, or any other type of physical input mechanism (e.g., one or more rudimentary buttons, a scroll-wheel entry device, or another mechanism). If the keypad will be used for testing the user's ability to tactilely interact with the mobile device, the keypad should be arranged in such a way that the user needs to physically manipulate the mobile device in some manner, beyond merely a simple button to activate speech input (as speech input would not constitute tactile interaction with the device). Although FIG. 4 depicts keypad 16 as a separate functional component of the mobile device, it should be understood that, if a keypad is used to test the user's tactile interaction with the device, the keypad could alternatively be integrated with the display screen, as a touch-sensitive keypad presented on the display screen for instance, or in the form another physical manipulation mechanism that allows user manipulation of the mobile device in accordance with a presented graphical display.

Communication interface 18 may comprise one or more communication mechanisms, to enable the mobile device to engage in local or long-range communication. By way of example, the communication interface 18 may comprise a short-range wireless communication module (e.g., a personal area network communication module arranged to communicate according to a protocol such as BLUETOOTH, ZIGBEE, WIFI, or the like) for engaging in wireless communication with nearby devices and systems such as in-vehicle systems for instance. As another example, the communication interface 18 may comprise a wired communication module (e.g., a USB circuit or other wired communication circuit) for engaging in wireline communication with nearby devices and systems, again such as in-vehicle systems for instance. As yet another example, the communication interface 18 may comprise a long-range wireless communication interface (such as a cellular wireless module) for engaging in telephony and/or Internet communication for instance. And as yet another example, communication interface 18 may comprise a Global Positioning System (GPS) receiver for communicating with GPS satellites and facilitating location determination. Other examples of communication interfaces are possible as well.

Processor 20 may comprise one or more general purpose processors (e.g., INTEL microprocessors) and/or one or more special-purpose processors (e.g., digital signal processors or application specific integrated circuits). And data storage 22 may comprise one or more volatile and/or non-volatile storage components, such as magnetic, optical, or organic storage components, and may be integrated in whole or in part with processor 22. Data storage 22 preferably contains program instructions 26 executable by processor 20 to carry out various mobile device functions described herein, although such functions could be implemented more generally by hardware, firmware, and/or software. Further, data storage 22 may contain reference data 28, such as user profile data and other information usable to facilitate implementation of the method.

Figure 5:
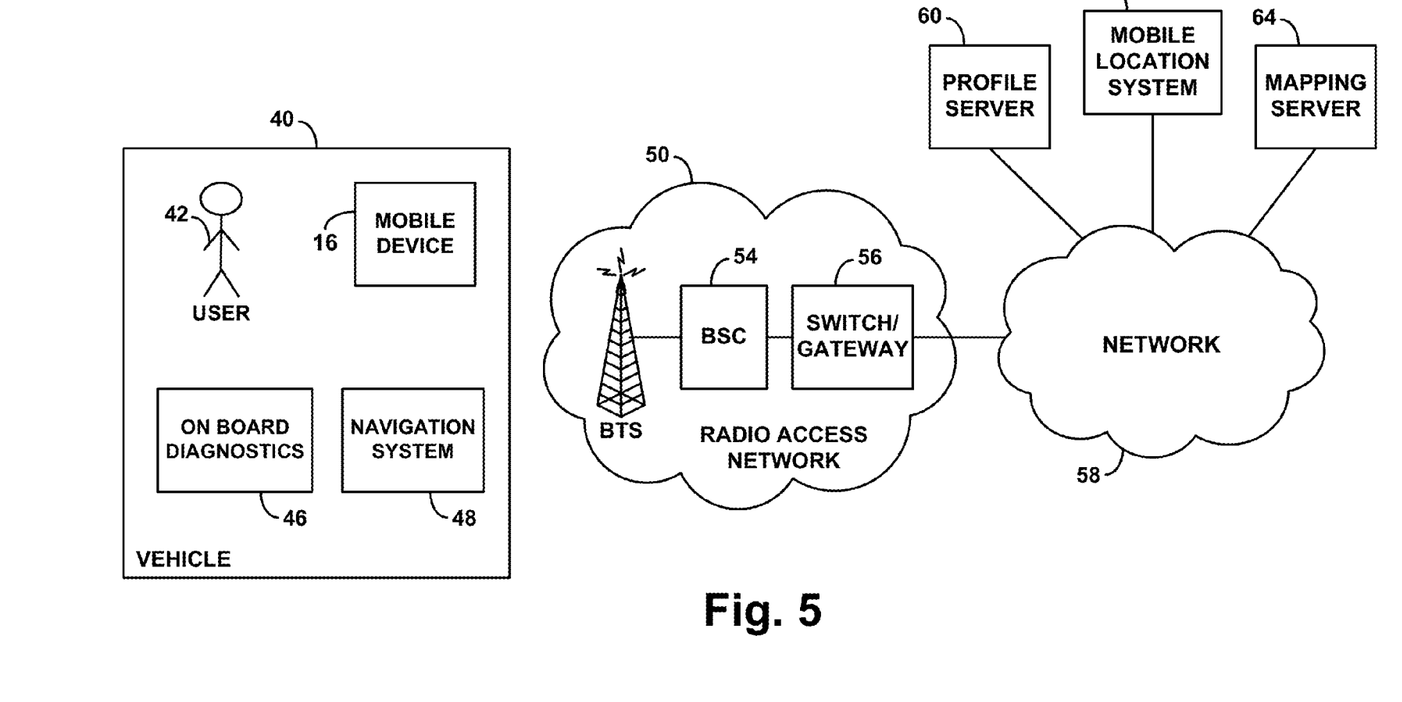
FIG. 5 is a simplified block diagram of a system in which an exemplary mobile device may operate.

FIG. 5 is next a simplified block diagram of a system in which an exemplary mobile device can operate. This system is merely one of many possible examples and is shown for illustration only and not by way of limitation.

Shown in FIG. 5 is a vehicle 40, such as a car, truck, motorcycle, boat, or aircraft, in or on which a user 42 may be situated. Further shown is a mobile device 44, which may be carried by the user 42 or may be integrated in some manner with the vehicle. Shown as other example components within the vehicle are then an on-board diagnostics (ODB) system 46 and a navigation system 48.

In practice, the mobile device may be arranged to communicate through a wired or wireless link with the ODB system, so as to determine that the mobile device is in the vehicle (e.g., by detecting a telltale ODB signal emitted from the ODB system, or in some other manner), and to determine an operational state of the vehicle, such as that the vehicle is in a drive-state or that the vehicle is moving at a particular speed. Likewise, the mobile device may be arranged to communicate through a wired or wireless link with the navigation system, so as to determine that the mobile device is moving along a known roadway or the like, or that the mobile device is moving at a particular speed.

As an alternative, the device itself may include functionality to make such determinations without interacting with in-vehicle systems. For instance, the device may include navigation logic itself and may thereby itself determine that it is traveling along a known roadway or that it is traveling at a particular speed.

FIG. 5 further depicts a cellular radio access network 50, including by way of example a base transceiver station (BTS) 52, a base station controller (BSC) 54, and a switch or gateway 56. In example operation, the BTS radiates to define cellular wireless coverage in which the mobile device may be served by the RAN, and the BTS and mobile device may communicate with each other according to an agreed air interface protocol, such as CDMA, WiMAX, iDEN, LTE, GSM, or another protocol now known or later developed. The BTS is then connected with the BSC, which may control aspects of BTS and air interface operation. And the BSC is connected with the switch or gateway, which provides connectivity with a network 58.

Shown sitting as nodes on network 58 or otherwise accessible via network 58 are a profile server 60, a mobile location system 62, and a mapping server 64. These components may function to assist the mobile device 44 in detecting a trigger condition that may justify testing the ability of user 42 to tactilely interact with the mobile device 44. For example, the profile server 60 may provide the mobile device with information about the age of user 42 and/or about whether user 42 is legally permitted to drive vehicle 12 (e.g., in accordance with the law applicable to the mobile device's current location). As another example, the mobile location system 62 may provide the mobile device with information about the mobile device's location or speed, or information to facilitate determination of the mobile device's location or speed. And as another example, the mapping server 64 may provide the mobile device with information about the mobile device's map-location, such as information indicating that the mobile device is moving along a known roadway. Other examples are possible as well.

Figure 6:
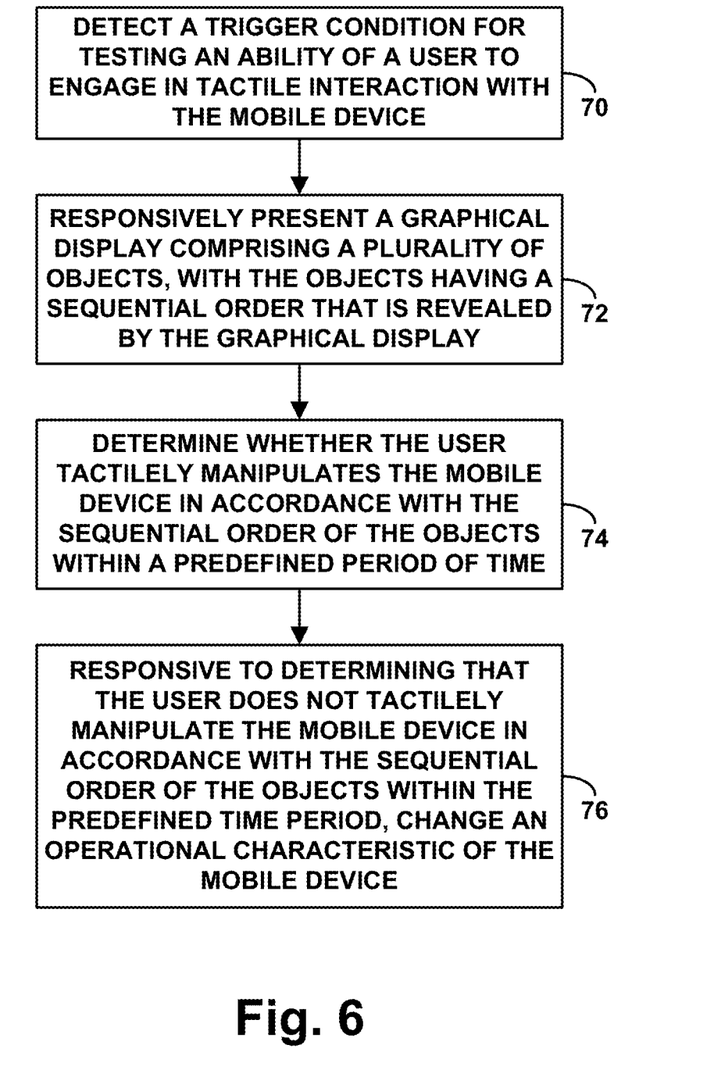
FIG. 6 is a flow chart depicting functions that can be carried out by an exemplary mobile device in accordance with the present method.

FIG. 6 is next a flow chart depicting functions that can be carried out in accordance with the present method.

As shown in FIG. 6, at block 70, the mobile device detects a trigger condition for testing an ability of a user to engage in tactile interaction with the mobile device. As noted above, the trigger condition may take various forms, and this function can therefore be implemented in various ways. By way of example, the trigger condition may comprise the user 42 driving a motor vehicle and more specifically the user seeking to use the mobile device (or use the mobile device in a particular manner) when the user is driving a motor vehicle. In practice, for instance, the user may expressly inform the mobile device that the user is driving a motor vehicle, by providing input to the device that specifically informs the device as much.

As another example, the trigger condition may comprise one or more circumstantial factors that suggest the user is driving a motor vehicle when the user attempts to use the mobile device. Some such factors may indicate that the mobile device is in a vehicle that is being driven, while other such factors may indicate that the mobile device is in use by the driver of the vehicle (as opposed to a passenger of the vehicle). These factors may not be accurate in all instances but may be used nonetheless as circumstantial evidence of the user driving a motor vehicle and more specifically as a trigger for testing the user's ability to engage in tactile interaction with the mobile device.

Factors that indicate the mobile device is in a vehicle that is being driven include the mobile device being in the vehicle (or, just the same, on the vehicle) and the vehicle being driven.

If the mobile device is integrated with the vehicle, it is assumed that the mobile device is in the vehicle. If the mobile device is not integrated with the vehicle, the mobile device may determine in various ways that it is in a vehicle. For instance, the mobile device may detect a signal transmitted from an in-vehicle system of some sort, thus establishing the mobile station's presence in the vehicle. In practice, the vehicle may be equipped with a special transmitter designed to emit a signal that the mobile device is, in turn, designed to detect as a sign that the mobile station is in the vehicle. The transmitter may be part of the ODB system 46, navigation system 48, or other in-vehicle system or may be a special-purpose transmitter in place to facilitate the present detection of in-vehicle mobile device use. Furthermore, such a transmitter may communicate directly with the mobile device or may communicate via the radio access network 50 with a server that may in turn notify the mobile device that the mobile device is in a vehicle.

The mobile device may likewise determine in various ways that the vehicle is being driven. By way of example, through communication with the ODB system 46, the mobile device may determine that the vehicle is in a drive-state (as opposed to a park or neutral state, for instance). As another example, through communication with the ODB system 46 or the navigation system 48, or through use of internal location tracking logic and/or communication with the mobile location system 62 and/or mapping server 64, the mobile device may determine that the mobile device or vehicle is moving at a particular speed typically associated with the vehicle being driven. And as yet another example, through communication with the navigation system 48 or through use of internal mapping logic or communication with the mapping server 64, the mobile device may determine that the mobile device or vehicle is moving along a path that corresponds with a known roadway, thereby further indicating that that the vehicle is being driven.

In turn, factors that may indicate the mobile device is in use by a driver of the vehicle may also take various forms. By way of example, if the mobile device is used as a key to unlock the vehicle or to start the vehicle's ignition, the mobile device may detect that it is used for that purpose, perhaps within a threshold time before the determination is made that the mobile device is in the vehicle and that the vehicle is being driven, as an indication that the mobile device is being used by the driver of the vehicle. As another example, through communication with profile server 60 or by reference to profile data stored on the mobile device or in the vehicle, the mobile device, may determine that the user is of legal driving age or is otherwise legally permitted to drive, perhaps considering the mobile device's location and the law applicable for that location. A determination that the user is legally permitted to drive may suggest that the user is the driver of the vehicle. Further, the mobile device may determine by reference to local data or communication with one or more other devices in the vehicle, or a server may determine by reference to profile data and inform the mobile device, that the user of the mobile device is the oldest user of mobile device users in the vehicle, which may likewise suggest that the user is the driver of the vehicle.

As still another example, the mobile device may detect a signal being emitted specifically in the driver's area of the vehicle, as an indication that the mobile device is in the driver's area of the vehicle, which would likewise be indicative that the mobile device is being used by the driver of the vehicle. Such a signal may be emitted by a special transmitter situated in or near the driver's seat in such a way as to specifically target the mobile device when in use by a driver of the vehicle. For instance, the transmitter could be embedded in a headrest of the driver's seat or in the steering wheel or dash, with a radiation pattern focused on the driver's head and hands.

The trigger condition may take still other forms as well. By way of example, the trigger condition may be merely a particular time of day, day of week, or the like, or the occurrence of a timer event. For instance, the mobile device may be arranged to execute the test at particular times when the user is likely to be driving or otherwise distracted. Or the mobile device may be arranged to execute the test periodically. Other examples are possible as well.

Continuing with FIG. 6, at block 72, in response to detecting the trigger condition including an attempt by the mobile device user to interact with the mobile device, the mobile device presents a graphical display comprising a plurality of objects, with the objects having a sequential order that is revealed by the graphical display (e.g., numerically, alphabetically, by color shade such as from dark to light or light to dark, by count of elements in each object, by size such as ranging from large to small or from small to large, or by any other means). FIGS. 1-3 and the accompanying discussion above provide some examples of this function, and numerous other examples are possible as well.

Optimally in this process, the mobile device may prompt the user to tactilely manipulate the mobile device in accordance with the sequential order of the objects. For example, with the arrangement of FIG. 1, the mobile device may prompt the user to touch the displayed objects in their sequential order. As another example, with the arrangement of FIG. 2, the mobile device may prompt the user to sort the displayed objects in their sequential order. And as another example, with the arrangement of FIG. 3, the mobile device may prompt the user to enter the presented character string using the device keypad. These prompts may be express, such as text instructions presented on the display screen, or may be implicit by the fact that the device presents the test.

At block 74, the mobile device then determines whether the user tactilely manipulates the mobile device in accordance with the sequential order of the objects within a predefined period of time. The mobile device may carry out this function in various ways, depending on the from of the presented test for instance. By way of example, with the arrangement of FIG. 1, the mobile device may determine if the user touches the presented buttons (individually or sliding from one to the next) in their revealed numerical order within the predefined period of time. As another example, with the arrangement of FIG. 2, the mobile device may determine if the user rearranges the buttons into numerical order (in any orientation, or in a particularly specified orientation, such as in a horizontal, vertical, or diagonal line) within the predefined period of time. And as yet another example, with the arrangement of FIG. 3, the mobile device may determine if the user enters the presented string of characters in the presented order using the device keypad within the predefined time period.

To determine whether the user tactilely manipulates the mobile device within the predefined time period, the mobile device may apply a timer set to the predefined time period. If the device determines that the user tactilely manipulates the device in accordance with the sequential order of the objects before the timer expires, then the device thereby determines that the user has passed the test. On the other hand, if the device detects that the timer expires before the user has tactilely manipulates the device in accordance with the sequential order of the objects, then the device thereby determines that the user did not pass the test.

The predefined time period is preferably sufficient to allow an average user to pass the test but short enough to prevent a sufficiently distracted user (e.g., a user who happens to be driving and therefore is focused on the road) from passing the test. Thus, the time period may be defined differently depending on the complexity of the test, such as the number of objects presented on the display or the difficulty of manipulating the device in accordance with the revealed sequence. For instance, if the graphical display presents six numbered objects that the user needs to touch, a reasonable period of time to give the user may be ten seconds. Whereas, if the graphical display presents twelve numbered objects that the user needs to touch, a reasonable period of time to give the user may be twenty seconds. Other examples are possible as well.

At block 76, in response to determining that the user does not tactilely manipulate the mobile device in accordance with the sequential order of the objects within the predefined time period, the mobile device changes an operational characteristic of the mobile device. Preferably, the change in operational characteristic of the mobile device will amount to an imposition of a limit on use of one or more functions of the mobile device, optimally to prevent the user from using such function(s) while the user is distracted as indicated by the user's failure to pass the test.

As such, the change in operational characteristic may take various forms, depending on numerous factors, such as the what type of device the mobile device is, how a user may normally interact with the mobile device in an unrestricted manner, and what particular function(s) of the device should be usefully disabled or limited for a distracted user, for instance. For example, as noted above, the change in operational characteristic of a cell phone or other device that supports text-messaging functionality may be disabling of text messaging functionality, or disabling of display screen output so as to prevent the user from reading the display or from manually entering text with display feedback. As another example, the change in operational characteristic of the device may be disabling of one or more non-hands-free functions such as keypad or touch-screen based text entry for instance, while allowing hands-free functions such as voice command and audible feedback. As still another example, the change in operational characteristic may simply be disabling of the display screen of the device in part (e.g., except for presentation of time of day or other such information) or in full. Still other examples are possible as well.

Figure 7:
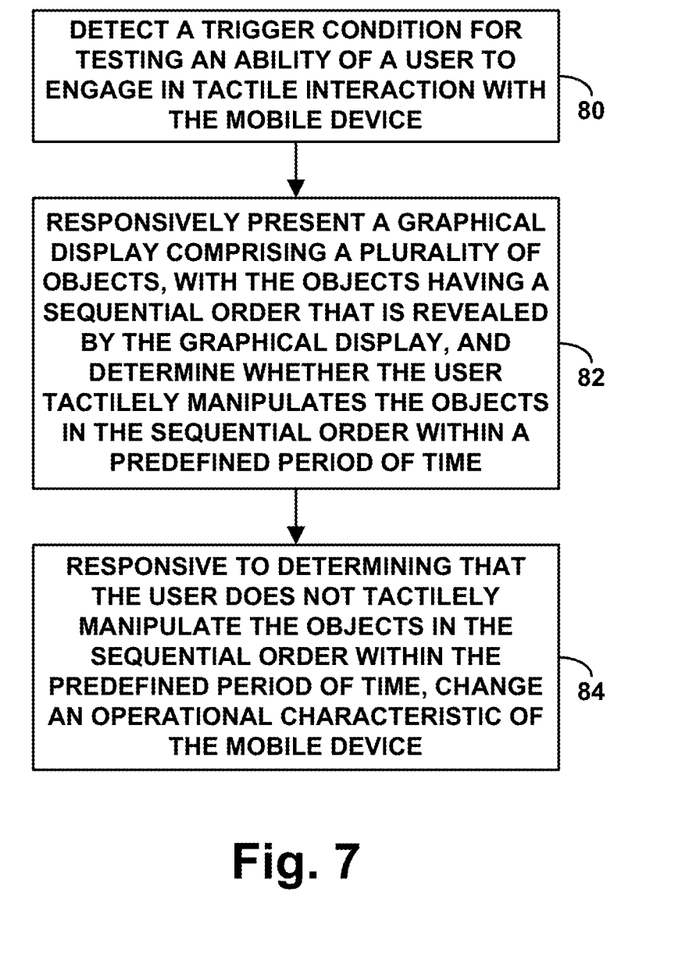
FIG. 7 is another flow chart depicting functions that can be carried out by an exemplary mobile station in accordance with the present method.

FIG. 7 is next another flow chart depicting functions that can be carried out in accordance with the present method.

As shown in FIG. 7, at block 80, the mobile device detects a trigger condition for testing an ability of a user to engage in tactile interaction with the mobile device. At block 82, responsive to detecting the trigger condition, the mobile device then presents a graphical display comprising a plurality of objects, with the objects having a sequential order that is revealed by the graphical display, and the mobile device determines whether the user tactilely manipulates the objects in the sequential order within a predefined period of time. For instance, the mobile device may determine whether the user touches the objects in their sequential order within the predefined period of time, or whether the user rearranges the objects into their sequential order within the predefined period of time. At block 84, responsive to determining that the user does not tactilely manipulate the objects in the sequential order within the predefined period of time, the mobile device then changes an operational characteristic of the mobile device.

An exemplary embodiment has been described above. Those of ordinary skill in the art will appreciate, however, that numerous changes to the embodiment described can be made without deviating from the invention as claimed.

We claim:

1. A method for changing an operational characteristic of a mobile device, the method comprising:
   the mobile device detecting a trigger condition for testing an ability of a user to engage in tactile interaction with the mobile device;
   responsive to detecting the trigger condition, the mobile device presenting a graphical display comprising a plurality of objects, the objects having a sequential relationship among each other that is revealed by the graphical display, the sequential relationship defining a sequence of the objects, wherein the mobile device comprises a touch-sensitive display screen, and wherein presenting the graphical display comprising the plurality of objects comprises presenting the objects at various positions on the display screen;
   the mobile device determining whether, within a predefined period of time while the sequential relationship among the objects is revealed by the graphical display, the user tactilely manipulates the mobile device in accordance with the sequential relationship among the objects, wherein determining whether the user tactilely manipulates the mobile device in accordance with the sequential relationship among the objects within the predefined period of time while the sequential relationship among the objects is revealed by the graphical display comprises a function selected from the group consisting of (i) determining whether, within the predefined period of time, the user touches the presented objects with the touching being done in order of the sequence as defined by the revealed sequential relationship among the objects and (ii) determining whether, within the predefined period of time, the user moves the presented objects on the display screen into the sequence defined by the revealed sequential relationship among the objects; and
   responsive to determining that the user does not tactilely manipulate the mobile device in accordance with the sequential relationship among the objects within the predefined period of time, the mobile device changing the operational characteristic of the mobile device.

2. The method of claim 1,
   wherein determining whether the user tactilely manipulates the mobile device in accordance with the sequential relationship among the objects within the predefined period of time while the sequential relationship among the objects is revealed by the graphical display comprises determining whether, within the predefined period of time, the user touches the presented objects with the touching being done in order of the sequence as defined by the revealed sequential relationship among the objects.

3. The method of claim 2, wherein the graphical display reveals the sequential relationship among the objects as (i) a numerical order, (ii) an alphabetical order, or (iii) a size order.

4. The method of claim 1,
   wherein determining whether the user tactilely manipulates the mobile device in accordance with the sequential relationship among the objects within the predefined period of time while the sequential relationship among the objects is revealed by the graphical display comprises determining whether, within the predefined period of time, the user moves the presented objects on the display screen into the sequence defined by the revealed sequential relationship among the objects.

5. The method of claim 4, wherein the graphical display reveals the sequential relationship among the objects as (i) a numerical order, (ii) an alphabetical order, or (iii) a size order.

6. The method of claim 1, wherein changing the operational characteristic of the mobile device comprises setting the mobile device to block one or more non-hands-free functions.

7. The method of claim 1, wherein changing the operational characteristic of the mobile device comprises disabling graphical display output.

8. The method of claim 1, wherein the trigger condition comprises the user driving a motor vehicle.

9. The method of claim 1, wherein the trigger condition comprises at least one of (i) the mobile device being in a moving vehicle, (ii) the mobile device being positioned in a driver's area of a moving vehicle, (iii) the mobile device moving at a threshold speed, (iv) the mobile device moving along a known roadway, and (v) the user being of at least driving age, or otherwise permitted to drive, under applicable law.

10. A method for determining whether to change an operational characteristic of a mobile device, the method comprising:

the mobile device detecting a trigger condition for testing an ability of a user to engage in tactile interaction with the mobile device;

responsive to detecting the trigger condition, (i) the mobile device presenting a graphical display comprising a plurality of objects, the objects having a sequential relationship among each other that is revealed by the graphical display, the sequential relationship defining a sequence of the objects, wherein the mobile device comprises a touch-sensitive display screen, and wherein presenting the graphical display comprising the plurality of objects comprises presenting the objects at various positions on the display screen, and (ii) the mobile device determining whether, within a predefined period of time while the sequential relationship among the objects is revealed by the graphical display, the user tactilely manipulates the objects in accordance with the defined sequence, wherein determining whether the user tactilely manipulates the mobile device in accordance in the defined sequence within the predefined period of time while the sequential relationship among the objects is revealed by the graphical display comprises a function selected from the group consisting of (i) determining whether, within the predefined period of time, the user touches the presented objects with the touching being done in order of the sequence as defined by the revealed sequential relationship among the objects and (ii) determining whether, within the predefined period of time, the user moves the presented objects on the display screen into the sequence defined by the revealed sequential relationship among the objects;

responsive to determining that the user does not tactilely manipulate the objects in the defined sequence within the predefined period of time, the mobile device changing the operational characteristic of the mobile device.

11. The method of claim 10,
wherein determining whether the user tactilely manipulates the objects in the defined sequence within the predefined period of time while the sequential order of the objects is revealed by the display comprises determining whether, within the predefined period of time, the user touches the presented objects in the defined sequence with the touching being done in order of the sequence as defined by the revealed sequential relationship among the objects.

12. The method of claim 10, wherein presenting the plurality of objects at various positions on the display screen comprises randomly positioning the plurality of objects on the display screen.

13. The method of claim 10,
wherein determining whether the user tactilely manipulates the objects in the defined sequence within a predefined period of time while the sequential order of the objects is revealed by the graphical display comprises determining whether, within the predefined period of time, the user drags the objects into the defined sequence on the display screen.

14. The method of claim 13, wherein presenting the plurality of objects at various positions on the display screen comprises randomly positioning the plurality of objects on the display screen.

15. The method of claim 10, wherein the trigger condition comprises the mobile device moving at a threshold speed.

16. The method of claim 15, wherein the trigger condition further comprises the mobile device moving along a known roadway.

17. The method of claim 16, wherein the trigger condition further comprises the user being legally permitted to drive.

18. The method of claim 10, wherein changing the operational characteristic of the mobile device comprises setting the mobile device to block one or more non-hands-free functions.

19. A mobile device comprising:
a display screen;
a processor;
data storage;
program logic stored in the data storage and executable by the processor to carry out functions comprising:
  (a) detecting a trigger condition for testing an ability of a user to engage in tactile interaction with the mobile device,
  (b) responsive to detecting the trigger condition, presenting on the display screen a graphical display comprising a plurality of objects, the objects having a sequential relationship among each other that is revealed by the graphical display, the sequential relationship defining a sequence of the objects,
  (c) determining whether, within a predefined period of time while the sequential relationship among the objects is revealed by the graphical display, the user tactilely manipulates the mobile device in accordance with the sequential relationship among the objects, wherein determining whether the user tactilely manipulates the mobile device in accordance with the sequential relationship among the objects within a predefined period of time while the sequential relationship among the objects is revealed by the graphical display comprises a function selected from the group consisting of (i) determining whether, within the predefined period of time, the user touches the presented objects with the touching being done in order of the sequence as defined by the revealed sequential relationship among the objects and (ii) determining whether, within the predefined period of time, the user moves the presented objects on the display screen into the sequence defined by the revealed sequential relationship among the objects, and (d) responsive to the determining that the user does not tactilely manipulate the mobile device in accordance with the sequential relationship among the objects within the predefined period of time, restricting at least one function of the mobile device.

20. A method for changing an operational characteristic of a mobile device, the method comprising:

the mobile device detecting a trigger condition for testing an ability of a user to engage in tactile interaction with the mobile device;

responsive to detecting the trigger condition, the mobile device presenting a graphical display comprising a plurality of objects, the objects having a sequential relationship among each other that is revealed by the graphical display, the sequential relationship defining a sequence of the objects, wherein the objects having the sequential relationship among each other define a character string, and the mobile device determining whether, within a predefined period of time while the sequential relationship among the objects is revealed by the graphical display, the user tactilely manipulates the mobile device in accordance with the sequential relationship among the objects, wherein determining whether the user tactilely manipulates the mobile device in accordance with the sequential relationship among the objects within a predefined period of time while the sequential relationship among the objects is revealed by the graphical display comprises determining whether, within the predefined period of time, the user enters the character string using a keypad of the mobile device; and responsive to determining that the user does not tactilely manipulate the mobile device in accordance with the sequential relationship among the objects within the predefined period of time, the mobile device changing the operational characteristic of the mobile device.

21. The method of claim 20, wherein the keypad is presented on a touch-sensitive display screen of the mobile device.

* * * * *